(12) United States Patent
Hibi et al.

(10) Patent No.: US 7,059,168 B2
(45) Date of Patent: Jun. 13, 2006

(54) ULTRASOUND PHANTOM

(75) Inventors: Yasushi Hibi, Hino (JP); Tsutomu Urakawa, Hachioji (JP); Teruaki Sugata, Hachioji (JP)

(73) Assignee: Olympus Corporation, Tokyo (JP)

( * ) Notice: Subject to any disclaimer, the term of this patent is extended or adjusted under 35 U.S.C. 154(b) by 205 days.

(21) Appl. No.: 10/671,076

(22) Filed: Sep. 25, 2003

(65) Prior Publication Data

US 2004/0060340 A1 Apr. 1, 2004

(30) Foreign Application Priority Data

Oct. 1, 2002 (JP) .............. 2002-288950
Dec. 17, 2002 (JP) .............. 2002-365719

(51) Int. Cl.
  *A61B 19/00* (2006.01)
  *A61B 8/00* (2006.01)
  *G09B 23/30* (2006.01)

(52) U.S. Cl. .............. 73/1.86; 73/866.4; 434/272

(58) Field of Classification Search .............. 73/1.86, 73/866.4; 434/272
See application file for complete search history.

(56) References Cited

U.S. PATENT DOCUMENTS

| | | | | |
|---|---|---|---|---|
| 3,310,885 A | * | 3/1967 | Alderson | 434/267 |
| 4,286,168 A | * | 8/1981 | Carr | 250/505.1 |
| 4,493,653 A | * | 1/1985 | Robbins et al. | 73/866.4 X |
| 4,767,333 A | * | 8/1988 | Born | 434/262 |
| 4,867,168 A | * | 9/1989 | Stoor et al. | 600/416 |
| 4,974,461 A | * | 12/1990 | Smith et al. | 73/1.86 X |
| 6,190,915 B1 | * | 2/2001 | Madsen et al. | 73/1.86 X |
| 6,318,146 B1 | * | 11/2001 | Madsen et al. | 73/1.86 |
| 6,464,639 B1 | * | 10/2002 | Kim et al. | 600/443 |
| 6,997,719 B1 | * | 2/2006 | Wellman et al. | 434/272 |
| 2002/0170339 A1 | * | 11/2002 | Passi et al. | 73/1.86 |
| 2004/0067591 A1 | * | 4/2004 | Madsen et al. | 73/1.86 X |

FOREIGN PATENT DOCUMENTS

| | | |
|---|---|---|
| JP | 55-73250 | 6/1980 |
| JP | 62-15213 | 4/1987 |
| JP | 63-40097 | 8/1988 |

* cited by examiner

*Primary Examiner*—Thomas P. Noland
(74) *Attorney, Agent, or Firm*—Scully, Scott, Murphy & Presser, P.C.

(57) ABSTRACT

A base member formed of rubber or the like, which transmits ultrasound waves, includes a storage portion with a small width connected with a storage portion with a great width, wherein internal organ models, formed of animal internal organs or the like, such as an esophagus model, stomach model, and the like, are stored in these storage portions. A jelly-like member, which transmits ultrasound waves, is filled in around the internal organ models. An ultrasonic endoscope or the like can be inserted through an inserting hole so as to obtain ultrasonic images generally the same as with a case of inserting the ultrasonic endoscope or the like into a human body, thereby providing a training device which can be easily used.

17 Claims, 4 Drawing Sheets

ULTRASOUND PHANTOM

This application claims benefit of Japanese Application Nos. 2002-288950 filed on 1 Oct. 2002 and 2002-365719 filed on 17 Dec. 2002 the contents of which are incorporated by this reference.

BACKGROUND OF THE INVENTION

1. Field of the Invention

The present invention relates to an ultrasound phantom, imitating a human body with regard to ultrasonic waves, suitable for training for medical checkup of the body cavity with an ultrasonic probe or an ultrasonic endoscope by simulation.

2. Description of the Related Art

Conventionally, an arrangement disclosed in Japanese Examined Patent Application Publication No. 63-40097 is known as an example of an ultrasound phantom. The conventional arrangement has a configuration wherein an ultrasound transmission medium having ultrasound transmission speed or the like generally the same as with organic tissue is contained in a case, and is used for adjustment or testing of ultrasonic diagnosis apparatuses.

SUMMARY OF THE INVENTION

An ultrasound phantom comprises a base member which is formed of a material for transmitting ultrasound waves so as to imitate at least a part of a human body, and includes a first storage portion with a small width connected with a second storage portion with a great width, one or more internal organ models, which are stored in the first and second storage portions, for imitating human internal organs, and a jelly-like member for transmitting ultrasound waves, disposed so as to be filled in around the internal organ models.

BRIEF DESCRIPTION OF THE DRAWINGS

FIGS. 1 through 6 show a first embodiment of the present invention, wherein FIG. 1 is a perspective view which illustrates a schematic configuration of an ultrasound phantom according to the first embodiment;

FIG. 2 is a cross-sectional diagram which illustrates an internal configuration of the ultrasound phantom shown in FIG. 1;

FIG. 6 is a perspective view which illustrates a jig for removing a mucous membrane according to a modification.

DESCRIPTION OF THE PREFERRED EMBODIMENTS

Description will be made regarding embodiments according to the present invention with reference to the drawings.

First Embodiment

Description will be made regarding a first embodiment of the present invention with regard to FIGS. 1 through 6.

Figure 1:
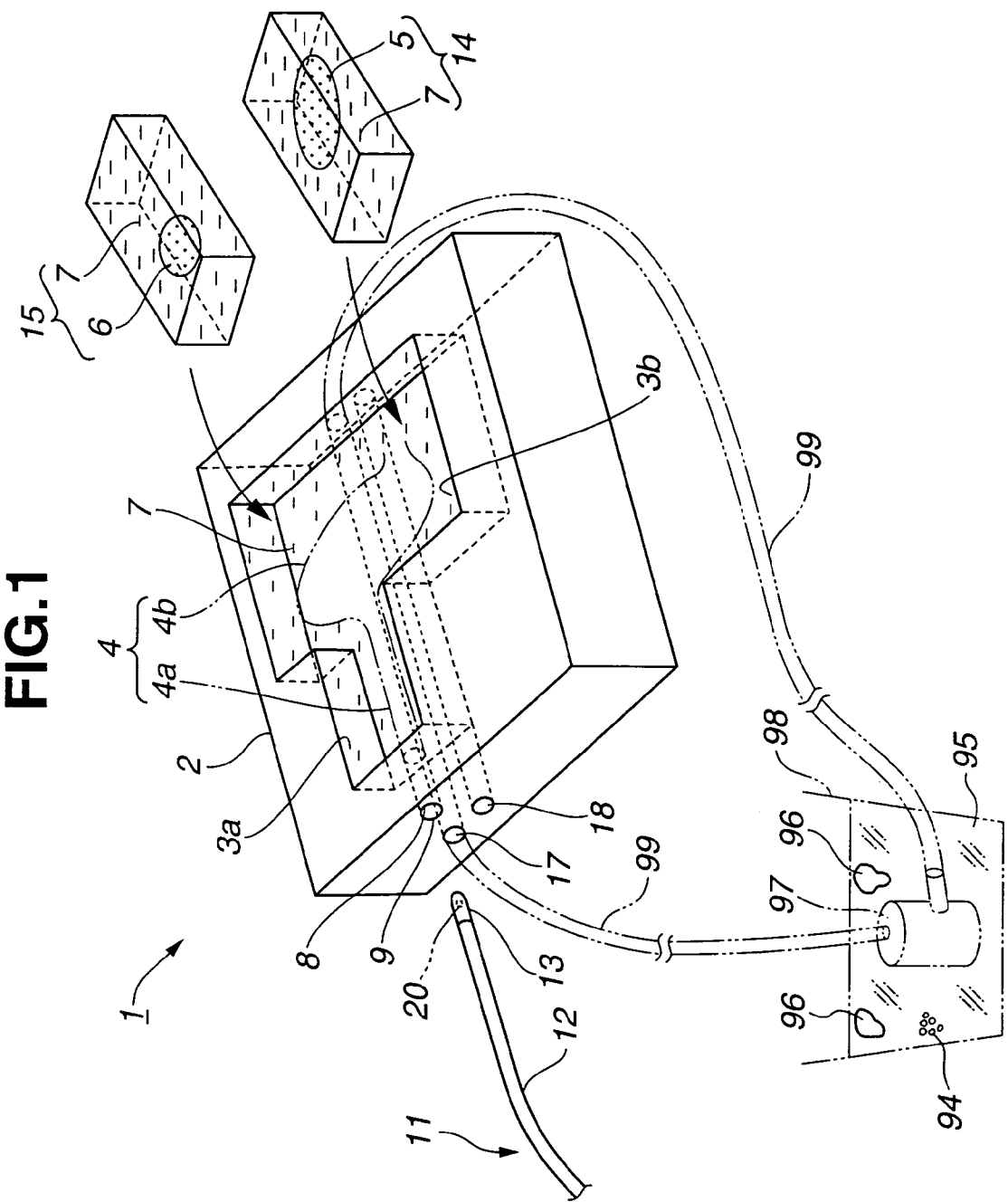

As shown in FIG. 1, an ultrasound phantom 1 according to the first embodiment of the present invention comprises a base 2 generally imitating a part of a human body, internal organ models (imitations of internal organs) 4, 5, and 6, imitating human internal organs, which are detachably stored in storage portions 3a and 3b provided on the upper side of the base 2, for example, and a jelly-like material (gel material) 7 which is filled in and stored around the internal organ models 4, 5, and 6, so as to fix these internal organ models.

The base 2 is made up of a generally rectangular parallelepiped block formed of a material such as rubber which transmits ultrasound waves, imitating the shape of the human body in the range between the neck and the abdominal region, as shown in FIG. 1, wherein the storage portion 3a with a narrow width and a suitable depth is formed on the upper side thereof, and furthermore, the storage portion 3b with a wide width is formed so as to extend the end portion (rear end) of the storage portion 3a in a step-shaped fashion, for example, and communicate therewith.

Figure 3A:
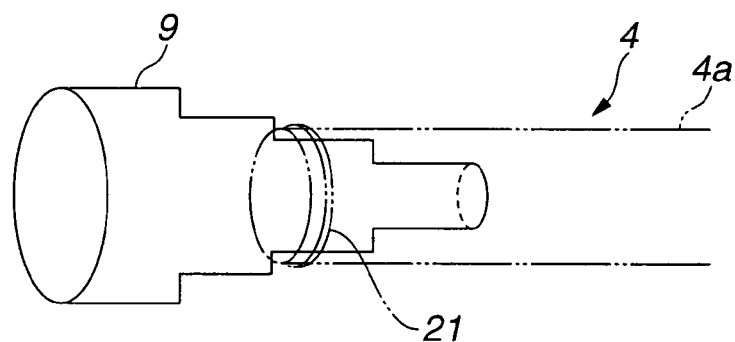
FIG. 3A is an explanatory diagram which illustrates a configuration of a fixing portion of an esophagus model.

Furthermore, with the wall of the base 2 where the front end portion of the storage portion 3a has been formed, an inserting hole 8 is formed in the form of a through hole communicating from the outer face to the storage portion 3a, and the front end of an esophagus model 4a imitating an esophagus shown in FIG. 3A is fixed to the inserting hole 8 with an esophagus fixing tube 9.

Furthermore, the tip portion 13 of an inserting portion 12 of an ultrasonic endoscope 11 shown in FIG. 1 can be inserted from the front end of the esophagus model 4a. An ultrasonic transducer 20 for transmitting and receiving ultrasound waves is disposed within the tip portion 13.

Furthermore, a stomach model 4b, imitating the stomach, is connected to the bottom end side of the esophagus model 4a, whereby an upper digestive organ model 4 imitating an upper digestive organ is formed.

As the internal organ model 4, internal organs of animals, more specifically, internal organs such as an esophagus and stomach of a pig are used for imitating the esophagus and the stomach positioned on the rear end thereof of a human body. Furthermore, the internal organ model 4 has properties imitating the esophagus and the stomach positioned on the rear end thereof of a human body with regard to sound waves, more particularly, with regard to ultrasonic waves.

In this case, the esophagus model 4a is formed in a long and narrow shape, and accordingly is stored within the storage portion 3a with a small width, and on the other hand, the stomach model 4b is formed with a great width, and accordingly is stored within the storage portion 3b with a great width.

Furthermore, another internal organ model 5, and a lymph node model 6 imitating a lymph node which is an object of biopsy by puncture, for example, are disposed around the internal organ model 4.

In this case, the other internal organ model 5 and the lymph node model 6 can be stored so as to be embedded in the jelly-like materials 7 in the form of blocks 14 and 15.

Note that, with the lymph node model 6, a fruit such as a grape or the like is employed for imitating an actual lymph node with regard to sound waves.

With the configuration of the present embodiment, the storage portion 3a with a small width serves as a space for storing the esophagus model 4a generally imitating the esophagus of human body with an internal organ of an animal, and a space for storing the internal organ therearound (lymph node model 6 or unshown tube member imitating bronchial tubes), and on the other hand, the storage portion 3b with a great width serves as a space for storing an internal organ model such as the stomach model 4b imitating the stomach of the human and the internal organs therearound, or the like.

Furthermore, a soft elastic member transmitting ultrasonic waves, specifically, a jelly-like member 7 formed of agar, gelatin, or the like, is filled in around the internal organ models 4, 5, and 6, stored within the storage portions 3a and 3b, whereby the internal organ models 4, 5, and 6, are fixed. Note that jelly-like members 7 which harden due to passing of time have an advantage in that the hardness (softness) thereof can be adjusted by adjusting the amount of water for mixing at the time of preparing. With the present embodiment, the jelly-like member 7 with the generally optimal hardness was obtained by dissolving 4 g of powdered agar into 900 cc of water.

As described above, with the present embodiment, the storage portion 3a with a small width is formed at the front end of the base 2, and the storage portion 3b with a great width is formed at the rear end thereof, so as to provide just enough space for storing principal internal organs of the human body in the range between the esophagus and the internal organs around the stomach, whereby principal internal organ models such as the esophagus model 4a, the stomach model 4b, and the like, can be stored within the storage portions 3a and 3b, respectively, with a small amount of the jelly-like member 7 being filled therearound.

That is to say, in a case of providing a storage portion with a too great size, there is the need to prepare a great amount of the jelly-like member 7, leading to troublesome preparations, and furthermore, there is the problem that a long time is required for preparing a hardened jelly-like member 7 to a suitable hardness. On the other hand, with the present embodiment, only a minimal amount of the jelly-like member 7 necessary is used, thereby eliminating or reducing the above-described problems.

Furthermore, with the present embodiment, the lymph node model 6 or the like is embedded in the jelly-like member 7 so as to form a block such as the block 15 or the like, as described above, and accordingly, in the event that the lymph node model 6 or the like is damaged, the block 15 containing the damaged lymph node model 6 or the like is replaced with a new one, and thus, the ultrasound phantom 1 can be used again in a short time with a simple operation, thereby enabling repeated use with a simple operation, and furthermore, providing an ultrasound phantom having sufficient functions as a training device which can be easily used.

Furthermore, with the present embodiment, simulated treating can be performed, wherein the inserting portion 12 of the ultrasonic endoscope 11 is inserted into the esophagus model 4a, and at the same time, a puncture operative device is inserted into a channel provided within the inserting portion 12, and the esophagus model 4a is punctured with the puncture operative device so that the puncture operative device passes through the esophagus model 4a so that the lymph node model 6 around the esophagus model 4a is punctured therewith.

That is to say, the ultrasound phantom 1 according to the present embodiment wherein the ultrasonic endoscope 11 is inserted can be used as a training device for training for puncture treating while observing ultrasonic images, as well. In this case, upon the lymph node model 6 which is an object of puncture being punctured several times, is damaged, and accordingly, the lymph node model 6 is no longer able to be used as a training device.

As a countermeasure, with the present embodiment, the phantom 1 has a configuration made up of blocks so that the block containing the object of puncture can be easily individually replaced.

For example, the lymph node model 6 is readily damaged by puncture. In the event that the lymph node model 6 is damaged, just the block 15 containing the damaged lymph node model 6 is replaced as described above, whereby the ultrasound phantom 1 can be easily repaired so as to be used again.

As described above, the phantom 1 has a configuration wherein the base 2 stores the blocks 14 and 15, and accordingly, the phantom 1 can be repeatedly used with a simple operation, and thus, the phantom 1 has functions suitable for a training device.

Figure 2:
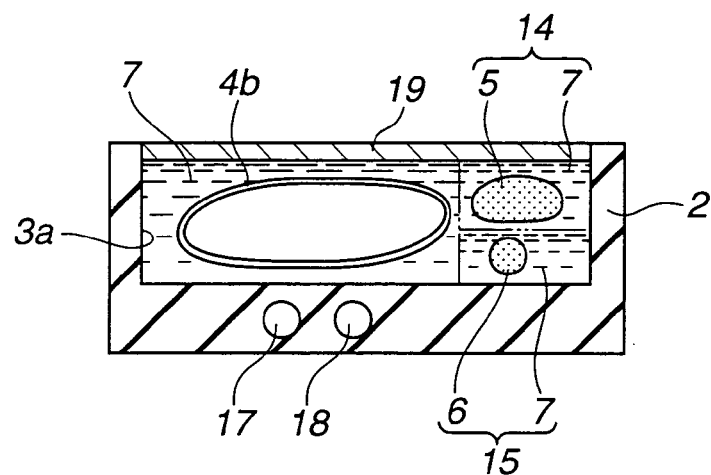

FIG. 2 illustrates an internal configuration of the ultrasound phantom 1 at the storage portion 3b, for example, wherein the jelly-like member 7 is filled in around the stomach model 4b, and the internal organ model 5 and the lymph node model 6 around the stomach model 4b are detachably stored with these models being embedded in the blocks 14 and 15.

Furthermore, the esophagus model 4a is mounted at the aforementioned inserting hole 8 with the esophagus fixing tube 9, and accordingly, the inserting portion 12 of the ultrasonic endoscope 11 can be inserted into the esophagus model 4a with the tip portion 13 thereof being at the head (in the same way as with a case of inserting an ultrasonic endoscope into the human esophagus), thereby obtaining ultrasonic diagnostic images while performing endoscope diagnosis and observing images from the optical system of the endoscope.

Furthermore, with the present embodiment, a tube-shaped blood vessel model cavity 17 imitating a human blood vessel, and a spine model cavity 18 in the shape of a tube, for example, imitating a human spine, are provided at the portions on the lower sides of the storage portions 3a and 3b in the base 2.

In this case, a tube is inserted into the blood vessel model cavity 17 so as to pour fluid thereinto, or a tube 99 is connected to the both ends of the blood vessel model cavity 17 so that fluid 95 stored in a bucket 98 flows therethrough by a pump 97, thereby providing a blood vessel model having functions generally the same as with a human blood vessel with regard to sound waves (more specifically, with regard to ultrasound waves).

Note that the fluid 95 stored in the bucket 98 contains microbubbles 94 for reflecting ultrasound waves, and also contains ice 96, kept in the bucket 98 against suction of the pump 97 due to the size thereof, for cooling the fluid 95. As described above, the fluid 95 is cooled due to the ice 96 contained therein, and accordingly, the base 2 and the components contained therein are cooled, thereby preventing decomposition of the components.

Furthermore, the spine model cavity 18 has a property of transmitting no ultrasound waves, with a simple configuration forming a tube-shaped cavity.

As described above, the blood vessel model cavity 17 and the spine model cavity 18 are provided on the side of the base 2 for imitating a human blood vessel and spine, and accordingly, in the event of inserting the ultrasonic endoscope 11 into the phantom 1, ultrasonic images generally the same as with a case of inserting the endoscope into the actual human esophagus, thereby providing a training device imitating the body cavities.

Furthermore, as shown in FIG. 2, following the internal organ models 4, 5, and 6 being stored within the storage portions 3a and 3b, and the jelly-like member 7 being filled therearound, the upper face thereof is covered with an echo jelly (ultrasonic jelly) 19. As described above, the upper face of the storage portions 3a and 3b is covered with the echo jelly 19, thereby preventing evaporation of water, and preventing decomposition of the components contained therein. Note that an arrangement may be made wherein penicillin antiseptic, fungicide, or an iodine antiseptic solution (e.g., brand name isodine) is added to the jelly-like member 7 prior to hardening so as to have a preservative function. Thus, the ultrasound phantom 1 can be used for a long time without decomposition.

Next, description will be made regarding a configuration for mounting the esophagus model 4a to the inserting hole 8 with reference to FIG. 3A.

With the present embodiment, internal organs of an animal are used so as to correctly imitate the human internal organs such as the esophagus and stomach, and accordingly, the size of the esophagus model 4a from the animal internal organ cannot be set to a constant value in practical use.

As a countermeasure, in order to easily mount the esophagus model 4a to the inserting hole 8 provided to the base 2 even in such a case, a step-shaped arrangement, wherein a suitable outer diameter can be selected, is employed for the esophagus fixing tube 9 for being connected to the inserting hole 8, as shown in FIG. 3A, and is connected to the esophagus 4a with a binder 21 or the like, at the portion with an outer diameter suitable for the inner diameter of the esophagus 4a which is used in this time.

Thus, even in the event that the size of the esophagus model 4a is not always the same for each replacement, the esophagus model 4a can be easily fixed to the inserting hole 8 using the esophagus fixing tube 9.

Figure 3B:
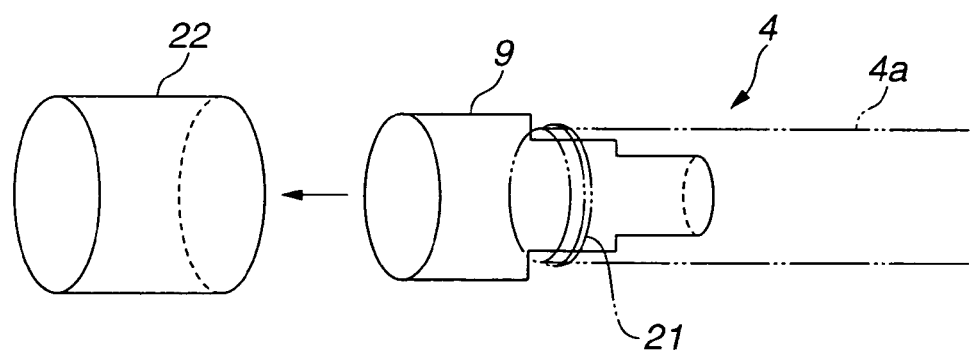
FIG. 3B is an explanatory diagram which illustrates a configuration of the fixing portion of the esophagus model according to a first modification of the present invention.

Note that the esophagus model 4a may be fixed to the inserting hole 8 as with a first modification shown in FIG. 3B. With the first modification shown in FIG. 3B, the step-shaped esophagus fixing tube 9 is fixed to the front end of the esophagus model 4a, as shown in FIG. 3A, and furthermore, the esophagus fixing tube 9 is fixed to the inserting hole 8 through an attachment 22 with a suitable size which can be mounted to the inserting hole 8.

Figure 4A:
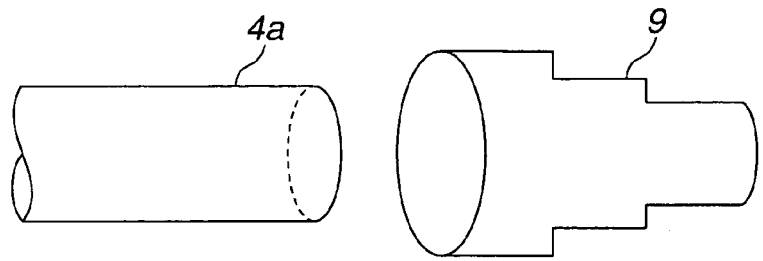
FIGS. 4A and 4B are explanatory diagrams which illustrate a configuration of the fixing portion of the esophagus model according to a second modification.
Figure 4B:
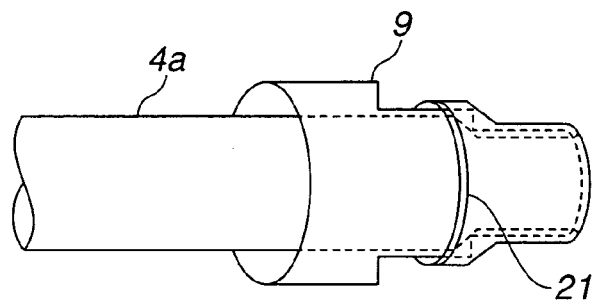

Furthermore, as shown in FIGS. 4A and 4B, the esophagus model 4a may be fixed to the inserting hole 8 using the esophagus fixing tube 9 shown in FIG. 3A.

That is to say, as shown in FIG. 4A, first of all, the opening end portion of the esophagus fixing tube 9 with the greater outer diameter, and the front end of the esophagus model 4a are positioned facing one another, and the esophagus model 4a is inserted so as to pass through the esophagus fixing tube 9, following which the portion of the esophagus model 4a protruding from the esophagus fixing tube 9 is turned back, as shown in FIG. 4B, and is fixed with the binder 21 or the like at the portion of the esophagus fixing tube 9 with an outer diameter greater than the inner diameter of the esophagus model 4a.

Note that, in a case shown in FIG. 4B, the ultrasonic endoscope 11 is inserted from the direction reverse to the case shown in FIG. 3A, i.e., from the right side.

With the arrangement shown in FIG. 4B, even in the event that friction occurs between the ultrasonic endoscope 11 and the esophagus model 4a during the operation of inserting the ultrasonic endoscope 11 with the front end portion 13 being at the head so as to be introduced on the depth side thereof, this arrangement prevents the esophagus fixing tube 9, for mounting the esophagus model 4a to the inserting hole 8, from coming off.

As described above, with the present embodiment, animal internal organs are employed for imitating the human esophagus and stomach, and accordingly, strong odor occurs from the animal internal organs in practical use. As a countermeasure, with the present embodiment, the internal organ model 4 generally causing the odor is opened so as to remove the mucous membrane thereon, following which suture or connection is performed for the opened portion, in order to be used as the internal organ model 4 imitating the human esophagus and stomach.

As described above, the odor is greatly reduced by removing the mucous membrane of the animal internal organs, thereby facilitating practical use of the phantom imitating the human esophagus and stomach.

Figure 5A:
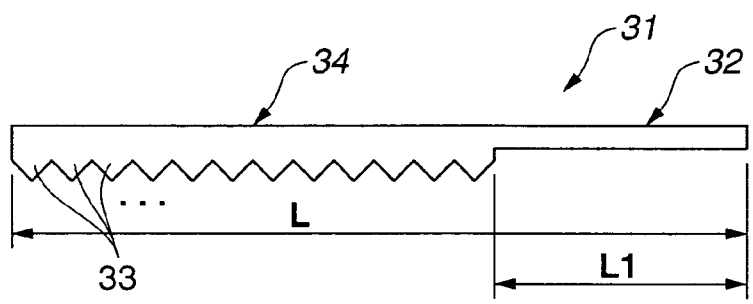
FIGS. 5A through 5C are a side view, an elevational view, and a plan view, of a jig for removing a mucous membrane.
Figure 5B:
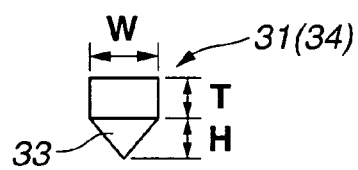
Figure 5C:
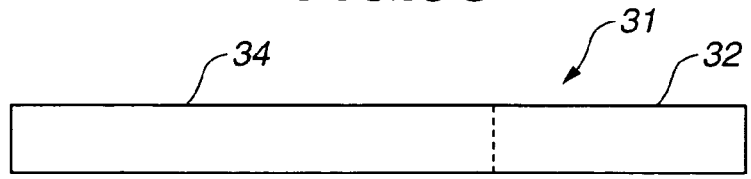

FIGS. 5A through 5C illustrate a jig 31 for removing the mucous membrane as described above. FIG. 5A is a side view of the jig 31, FIG. 5B is an enlarged elevational view thereof, and FIG. 5C is a plan view thereof.

The jig 31 is formed in the shape of a long and narrow plate, wherein the rear end portion serves as a holding portion 32, and a protrusion portion 33 formed of a great number of protrusions are provided on one face thereof along the longitudinal direction in front of the holding portion 32, whereby a mucous-membrane removal portion 34 is formed. The user can remove the mucous membrane by performing processing wherein the jig 31 is moved while the mucous-membrane removal portion 34 is pressed into contact with the mucous membrane.

Note that the jig 31 is formed with a total length L between 20 and 30 cm, and a length L1 of the holding portion 32 of around 10 cm, as shown in FIG. 5A.

On the other hand, the mucous-membrane removal portion 34 is formed with a width W of 1 cm, thickness T of 0.5 mm, and height H of the protrusions of the protrusion portion of around 0.5 mm, as shown in FIG. 5B. Note that the protrusions of the protrusion portion 33 are formed in the shape of a quadrangular pyramid.

The user can efficiently remove the mucous membrane causing the odor using the jig 31 including the mucous-membrane removal portion 34 shown in FIGS. 5A through 5C.

While there is the need to remove the mucous membrane of the internal organs, more particularly the mucous membrane of the stomach, in the event of employing animal internal organs for the phantom 1, a special-purpose tool has not been conventionally known, so the user removes the mucous membrane with tweezers, and consequently, a long time is required for removing the mucous membrane of the stomach. On the other hand, with the present embodiment, the user can remove the mucous membrane using the jig 31 including a protrusion portion 33 formed of a great number of protrusions as shown in FIGS. 5A through 5C, in a markedly short time as compared with a case of removing the mucous membrane without the jig 31.

Figure 6:
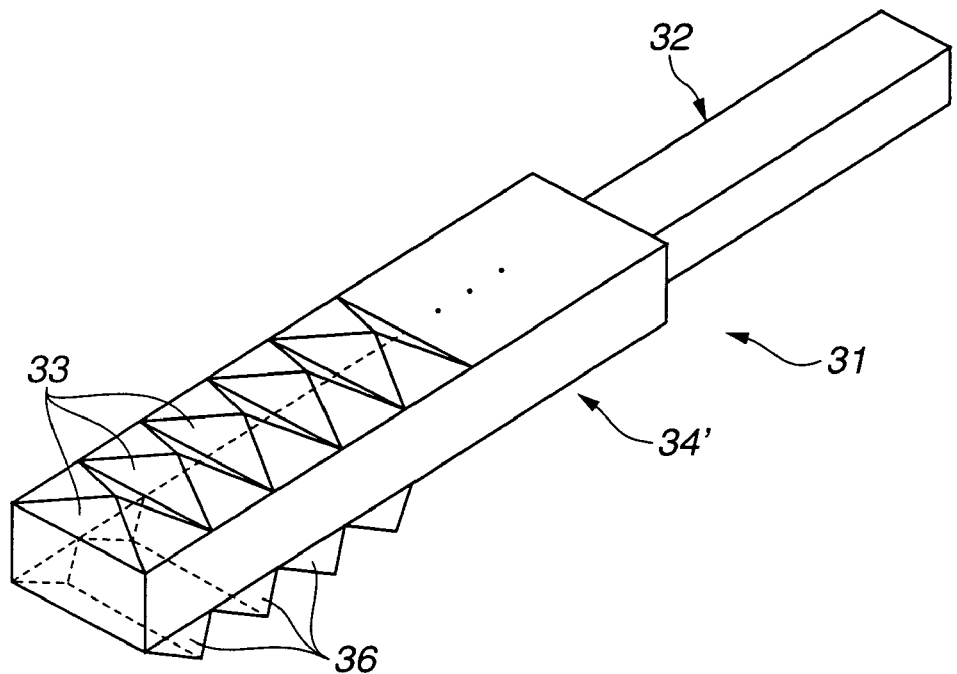

FIG. 6 shows a jig 31' which is a modification of the jig 31. The jig 31' has a basic configuration wherein, in addition to the configuration of the jig 31 shown in FIG. 5A or the like, a protrusion portion 36 formed of a great number of protrusions in the shape of a sawtooth, for example, is further formed on the other face reverse to the face where the protrusion portion 33 formed of a great number of protrusions has been provided, along the longitudinal direction, thus forming a mucous-membrane removal portion 34'.

As described above, with the present embodiment, the ultrasonic endoscope 11 can be inserted into the inserting hole 8 of the phantom 1 imitating the human body, and ultrasonic images generally the same as with a case of inserting the ultrasonic endoscope into the human esophagus can be easily obtained, and accordingly, the phantom 1 can be used as a training device using the ultrasonic endoscope 11, thereby providing a training system for improving the skill of the user in insertion of an ultrasonic endoscope or the like with a simple configuration.

Furthermore, with the present embodiment, the internal organ models which are readily damaged are each embedded into the jelly-like member so as to form blocks, and accordingly, in the event that one internal organ model is damaged, the phantom can be easily repaired so as to be used again in a short time by replacing a block containing the damaged internal organ model. That is to say, the phantom according to the present embodiment can be repeatedly used with a simple operation. Furthermore, the maintenance of the phantom can be easily performed.

Furthermore, simulation of puncture treating can be performed using the phantom according to the present embodiment, more specifically, simulation of puncture treatment while observing ultrasonic diagnostic images can be easily performed, thereby providing a training system for improving the skill of the user. In the event of employing an ultrasonic observing apparatus using color Doppler, the fluid flowing through the blood vessel model cavity 17 can be displayed in colors, and accordingly, training can be performed for improving the skill of the user in insertion wherein a puncture device is introduced while avoiding blood vessels with the spine model cavity 18 imitating the spine as a merkmal.

Furthermore, with the present embodiment, the internal organ models which are to be used for puncture treating are made up of fruits or the like, and accordingly, even in the event that the internal organ model is damaged, the phantom can be easily repaired with low costs by replacing the damaged internal organ model.

Furthermore, with the present embodiment, animal internal organs are employed for the esophagus model and the stomach model, and accordingly, the phantom has generally the same properties with regard to insertion, sound waves, and the like, as with the human body, thereby providing a training system for improving the skill of the user in insertion and the like.

Second Embodiment

Figure 7:
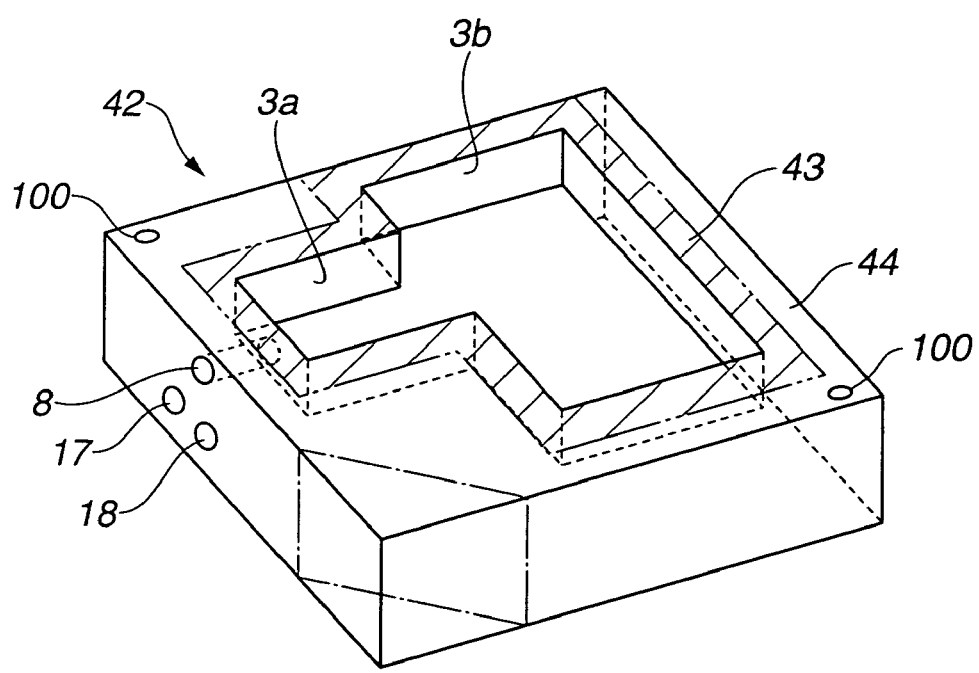
FIG. 7 is a perspective view which illustrates a configuration of a base portion of an ultrasound phantom according to a second embodiment of the present invention.

Next, description will be made regarding a second embodiment according to the present invention with reference to FIG. 7. FIG. 7 illustrates a base 42 according to the second embodiment.

The base 42 has a configuration wherein, in addition to the configuration of the base 2 shown in FIG. 1, the region around the portion where the storage portions 3a and 3b have been formed, i.e., a region 43 which is indicated by a double-dashed line in FIG. 7, with the upper face indicated by hatching, is formed of a material which transmits ultrasonic waves with small attenuation, i.e., a soft material with low attenuation properties, and the outer region 44 as to the region 43 indicated by the hatching is formed of a hard material with the attenuation properties with regard to ultrasound waves greater than with the region 43 indicated by the hatching.

Note that the base 42 includes multiple openings 100 for being fixed on an unshown stand (a desk or the like) with screws or the like. Other components are the same as with the first embodiment.

With the ultrasound phantom including the base 42 having such a configuration, the base 42 is formed with the improved strength, and accordingly, the phantom has a principal function required for a training device, i.e., sufficient durability for use in a long period, and also, for repeated use, and for preventing occurrence of damage which is readily caused by transporting, thereby providing a more preferable training device. Note that other functions of the phantom according to the present embodiment are the same as with the first embodiment.

Also, an arrangement may be made wherein the region around the storage portions 3a and 3b shown in FIG. 7 is particularly formed of a soft material in the depth direction, as well.

Furthermore, while FIGS. 1 through 7 illustrate the storage portions 3a and 3b in a shape with a constant depth, an arrangement may be made wherein the storage portions 3a and 3b are formed with a curved lower face according to the shape of the internal organ which is to be stored. In particular, with the base 42 shown in FIG. 7, the lower faces of the storage portions 3a and 3b are formed of a soft material with a shape according to the internal organ which is to be stored, and accordingly, positioning and storing can be easily performed for the internal organs, thereby facilitating manufacturing.

Furthermore, while FIGS. 1 and 7 show the storage portions 3a and 3b being connected in the form of a step, the present invention is not restricted to the aforementioned configuration, but rather, an arrangement may be made wherein the storage portions 3a and 3b are connected in a tapered shape or a curved shape. Furthermore, an arrangement may be made wherein an unnecessary region on the base 42 such as a region indicated by a dashed line in FIG. 7 is eliminated for reducing costs and weight.

Note that, while description has been made regarding the ultrasonic phantom as a training device for an ultrasonic endoscope which includes functions of an endoscope, and furthermore includes an ultrasonic transducer at the tip end portion thereof for transmitting and receiving ultrasound waves, the ultrasound phantom according to the present invention can be used as a training device for an ultrasonic prove having no functions of an endoscope for optical observation (illumination window and observation window), as well.

Furthermore, while description has been made regarding an arrangement wherein the esophagus model 4a and the stomach model 4b are formed of animal internal organs, the present invention is not restricted to the above-described arrangement, but rather, an arrangement may be made wherein the internal organ models such as the esophagus model 4a, the stomach model 4b, and the like, are formed of polymeric resin or the like.

As described above, with the ultrasound phantom according to the present invention, in the event of inserting an ultrasonic probe or ultrasonic endoscope into the ultrasound phantom, ultrasonic images generally the same as with inserting the ultrasonic probe or ultrasonic endoscope into the human body cavity are obtained, thereby providing a training device which can be easily used, having sufficient functions and properties for training.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. An ultrasound phantom comprising:
   a base member which is formed of a material for transmitting ultrasound waves so as to imitate a part of a human body, said base member includes a storage portion;
   one or more internal organ models, positioned in the storage portion for imitating human internal organs, at least one of said one or more internal organ models being adapted to be detachable; and
   a soft member for transmitting ultrasound waves, disposed so as to be filled in around the internal organ models.

2. An ultrasound phantom according to claim 1, wherein the base member has an inserting hole, communicating with the inside of the storage portion, into which an ultrasonic probe including an ultrasonic transducer can be inserted.

3. An ultrasound phantom according to claim 2, wherein the storage portion comprises a first storage portion with a first width and a second storage portion with a second width greater than the first width.

4. An ultrasound phantom according to claim 3, wherein one end of an esophagus model, which is stored in the first storage portion, for imitating an esophagus, is mounted to the inserting hole.

5. An ultrasound phantom according to claim 4, wherein one end of the esophagus model is fixed to the inserting hole via a fixing tube of which the outer periphery is step-shaped.

6. An ultrasound phantom according to claim 3, wherein a stomach model which imitates a stomach is stored in the second storage portion.

7. An ultrasound phantom according to claim 1, wherein the base member further includes a tube-shaped cavity for imitating a blood vessel.

8. An ultrasound phantom according to claim 7, wherein the tube-shaped cavity is connected to a unit for running fluid.

9. An ultrasound phantom according to claim 1, wherein the base member further includes a tube-shaped cavity for imitating a spine.

10. An ultrasound phantom according to claim 1, wherein the internal organ models are formed of animal internal organs.

11. An ultrasound phantom according to claim 10, wherein the animal internal organs are stored in the storage portion following removal of the mucous membrane thereof causing strong odor.

12. An ultrasound phantom according to claim 1, wherein the base member has a first member, formed of a soft material for transmitting ultrasound waves, which forms a portion around the region where the storage portion is formed, and a second member, formed of a material harder than the first material, which forms the region around the first member.

13. An ultrasound phantom according to claim 1, wherein the upper face of the storage portion is covered with a member for preventing evaporation of water or the like.

14. An ultrasound phantom according to claim 1, wherein the base member includes a material formed of rubber.

15. An ultrasound phantom according to claim 1, wherein the soft member includes a jelly-like member.

16. An ultrasound phantom according to claim 15, wherein the jelly-like member has a function for preventing decomposition.

17. An ultrasound phantom according to claim 15, wherein the jelly-like member comprises a material hardened from a soft material over time due to an addition of liquid.

* * * * *